United States Patent
Blea et al.

(10) Patent No.: US 10,831,621 B2
(45) Date of Patent: Nov. 10, 2020

(54) POLICY-DRIVEN HIGH AVAILABILITY STANDBY SERVERS

(71) Applicant: INTERNATIONAL BUSINESS MACHINES CORPORATION, Armonk, NY (US)

(72) Inventors: David R. Blea, Round Rock, TX (US); Anthony Ciaravella, Tucson, AZ (US); Wayne Sun, Tucson, AZ (US); Damian Trujillo, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 15/809,043

(22) Filed: Nov. 10, 2017

(65) Prior Publication Data

US 2019/0146887 A1 May 16, 2019

(51) Int. Cl.
*G06F 11/00* (2006.01)
*G06F 11/20* (2006.01)
*G06F 11/14* (2006.01)

(52) U.S. Cl.
CPC ........ *G06F 11/203* (2013.01); *G06F 11/1451* (2013.01); *G06F 11/1464* (2013.01); *G06F 2201/805* (2013.01); *G06F 2201/82* (2013.01)

(58) Field of Classification Search
CPC . G06F 11/203; G06F 11/1451; G06F 11/1464
See application file for complete search history.

(56) References Cited

U.S. PATENT DOCUMENTS

| | | | |
|---|---|---|---|
| 7,895,309 B2 | 2/2011 | Belali et al. | |
| 8,683,033 B2 | 3/2014 | Dake et al. | |
| 8,880,472 B2 | 11/2014 | Ponsford | |
| 9,735,971 B2* | 8/2017 | Castro Castro | ..... H04L 12/1407 |
| 2005/0071470 A1* | 3/2005 | O'Brien | .............. G06F 11/2097 |
| | | | 709/226 |
| 2008/0201360 A1 | 8/2008 | Kohli | |
| 2014/0019405 A1 | 1/2014 | Borthakur et al. | |
| 2014/0201314 A1* | 7/2014 | Borkenhagen | ...... G06F 11/1666 |
| | | | 709/216 |
| 2016/0085462 A1* | 3/2016 | Buzzard | ................. G06F 3/067 |
| | | | 711/162 |

* cited by examiner

*Primary Examiner* — Katherine Lin
(74) *Attorney, Agent, or Firm* — Griffiths & Seaton PLLC (57) ABSTRACT

Embodiments for policy-driven high availability (HA) standby servers in a multi-server high availability (HA) computing environment. Policies may be created that define selected sessions for a user (e.g., important sessions to the user) such that only one or more artifacts of each selected session are replicated to one or more HA standby servers. The one or more artifacts and the one or more policies of a selected session may be synchronized from a primary server to the one or more HA standby servers.

17 Claims, 9 Drawing Sheets

POLICY-DRIVEN HIGH AVAILABILITY STANDBY SERVERS

BACKGROUND OF THE INVENTION

Field of the Invention

The present invention relates in general to computing systems, and more particularly to, various embodiments for using policy-driven high availability (HA) standby servers in a multi-server high availability (HA) computing environment using one or more computing processors.

Description of the Related Art

Computing systems may be found in the workplace, at home, or at school. Computer systems may include data storage systems, or disk storage systems, to process and store data. Computer systems may have certain characteristics, including high reliability, robustness in the event of a failure, and fast and efficient search capabilities. High reliability and robustness are important in many business settings where lost transactions or an extended server downtime can be a severe hardship, and can result in lost sales, improperly tracked or lost inventories, missed product deliveries, and the like.

SUMMARY OF THE INVENTION

Various embodiments for using policy-driven high availability (HA) standby servers in a multi-server high availability (HA) computing environment by a processor are provided. In one embodiment, by way of example only, a method for using policy-driven HA standby servers in a multi-server high availability (HA) computing environment, again by a processor, is provided. Policies may be created that define selected sessions for a user (e.g., important sessions to the user) such that only one or more artifacts of each selected session are replicated to one or more HA standby servers. The one or more artifacts and the one or more policies of a selected session may be synchronized from a primary server to the one or more HA standby servers.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Today, many computing applications provide for managing and maintaining storage and data devices. These computing applications may maintain metadata on a database and property files and other formats. It is critical to have a way to recover the management application's configuration for the metadata at any given location in the event that a disaster occurs on the primary active server. This is known as high availability (HA).

Moreover, today's HA for storage management application solution requires a 1-to-1 relationship between the application and the storage system and requires more resources (e.g., disk space, bandwidth, central processing unit "CPU", etc.). The 1-to-1 relationship between the application and the storage system requires all information be backed up regardless of importance. HA implementations may be used in copy services manager ("CSM") applications. However, current HA implementations only allow a complete or full HA solution (e.g., "all or nothing" back up approach) and there are no policies that enable user flexibility as to what data is to be backed up on a standby server.

Accordingly, various embodiments provided herein provide a solution to only back up metadata of a session a user (e.g., customer) deems important. In this way, the amount of bandwidth used is reduced due to the reduction in data transferred that is required to continuously replicate the metadata between HA servers. With less data to backup/replicate from an active server to a standby server, more active servers may be designated to a single standby server particularly since there is less data and the standby server will not be overburdened. Said differently, since each source has a subset of data that is replicated to the standby server, more active servers can point to the standby without requiring an extremely large set of resources to be able to contain the different configurations.

In one aspect, high availability (such as for CSM) is the ability to save configuration metadata to a standby server and restore from it immediately at another site with little or no downtime. Thus, a user may be enabled to designate important sessions as compared to other less important sessions to a user such as, for example, test sessions. Once a session is designated as important, the selected session may then be replicated to a standby server in an HA relationship, which may be according to a policy file. The policy file may designate the important metadata. For example, if a user has set up several standby servers (e.g. several IBM® storage server DS8000s®) with important replication sessions, and several storage area network ("SAN") volume controllers with a proof of concept type of session, the user is only interested in maintaining and protecting the HA relationship for the standby server (e.g., DS8000) sessions. The user may specify a selected session (e.g., a session important to the user) that the user wants to HA. For example, some sessions (e.g., artifacts) that may be important, but are not limited to being backed up, may be subsystem configurations, user roles, and/or volume protection. With less data being transmitted across the active server to a standby server, more resources are freed up and available on a target system. In this way, more HA primary servers may point to a single standby server without impacting performance or overwhelming the network or other system resources according to a policy. Since the HA primary servers are separate servers that are being replicated and are keeping track of the individual artifacts, the user is enabled to track the individual artifacts as its own HA unit. Each session will be HA capable. Therefore, an HA primary server can perform a takeover operation from the HA standby server on an individual basis according to a policy. The created policies may indicate and determine which of the artifacts are important to the user. The policies enable quick application and setup for a user so as to determine, select, and update what artifacts will be backed up to an HA standby server.

Further, the mechanisms of the illustrated embodiments remove the one-to-one requirement for HA on a server level (e.g., one active server per one standby server) and will allow the objects or artifacts that are defined in the policy file to be replicated across multiple servers in a manner that allows one-to-N and/or N-to-one relationships, where N may represent the number of active/primary HA servers or the number of HA standby servers.

In an additional aspect, in a multi-server, high availability environment, one or more policies may be created to define important sessions to a user (e.g., customer) such that only the metadata that the user deems important is backed up to an HA standby server from an HA active server (e.g., HA primary sever). Objects and artifacts may be synchronized to the standby server (including the created policy). Upon a disaster or failure event at an HA active server(s), the policy and the artifacts may remain on the HA standby server such that when the HA active server(s) is back up or replaced, a takeover operation causes the policy for the artifact to switch from the HA active server(s) to the HA standby server and allows the high availability relationship to recover the session object back to the HA active server(s) that failed or entered a standby mode.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
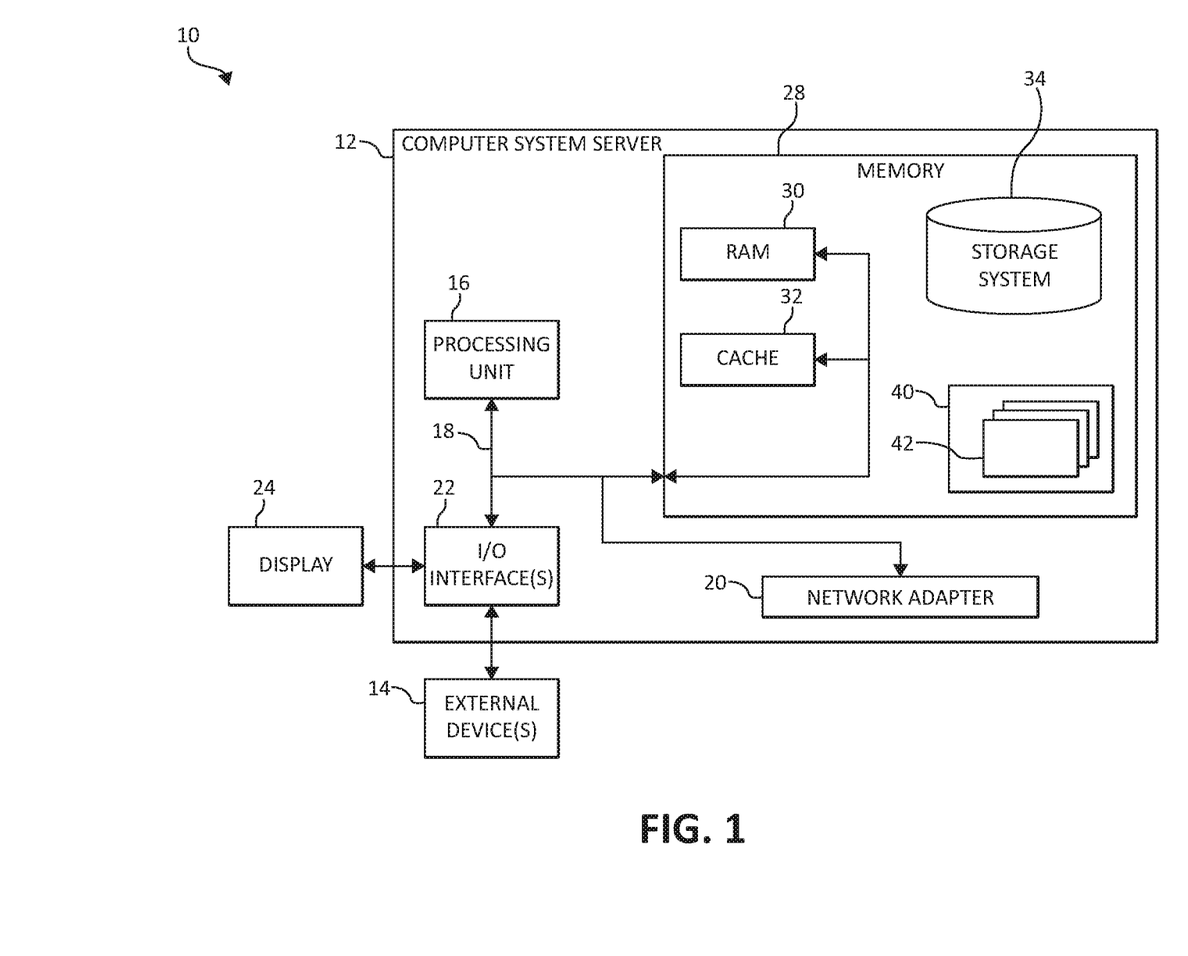
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
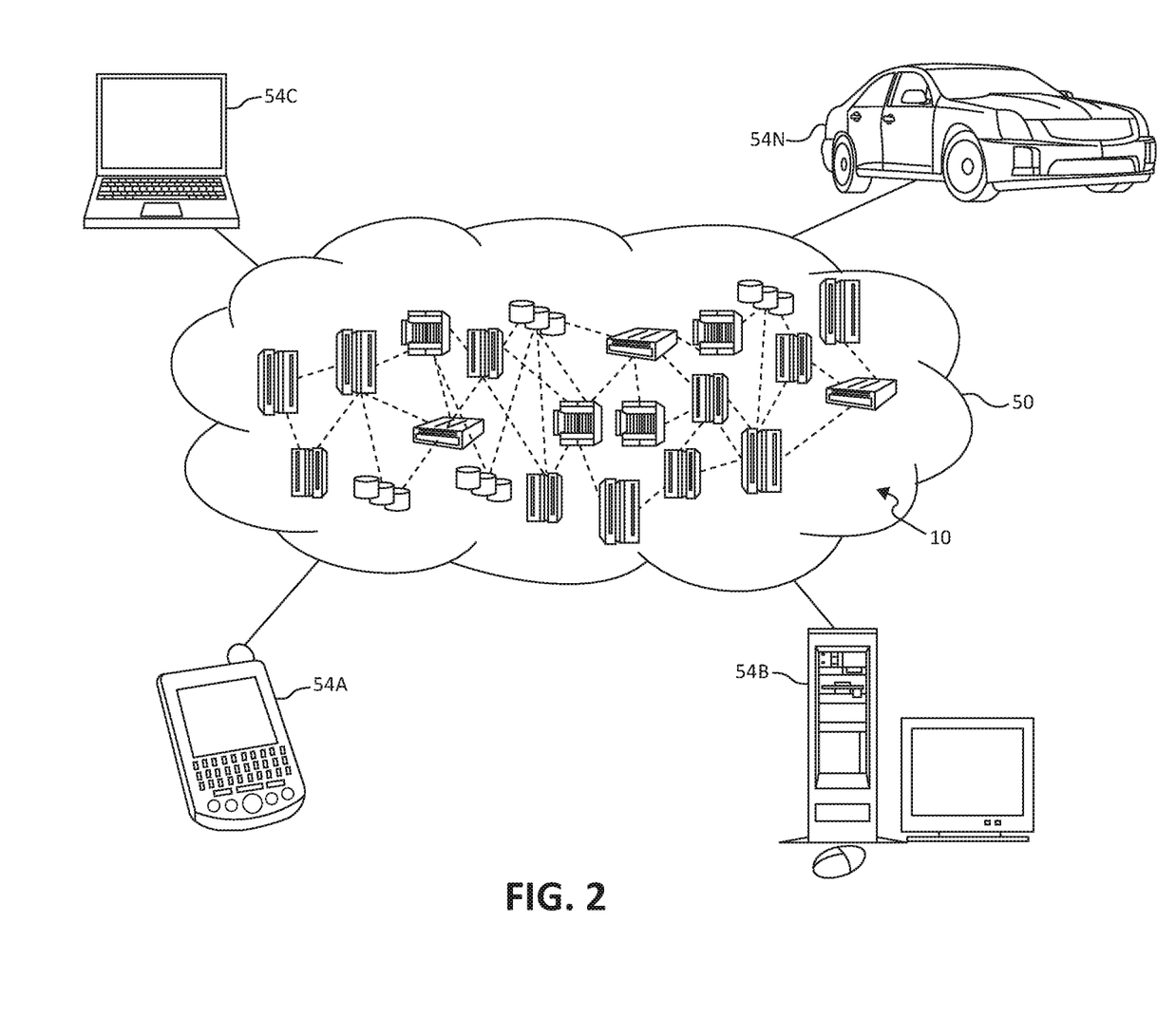
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
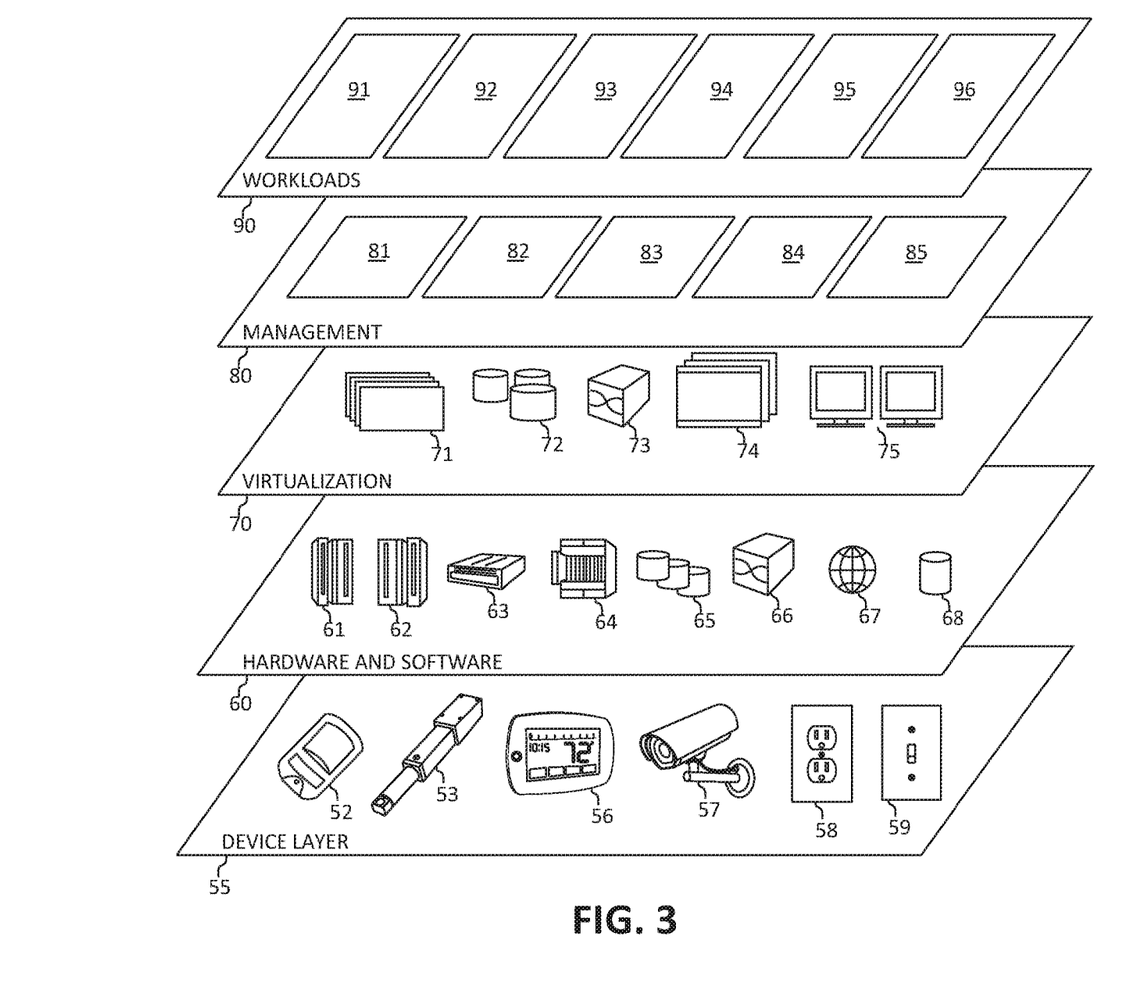
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various policy driven HA standby server workloads and functions 96. In addition, policy driven HA standby server workloads and functions 96 may include such operations as data analytics, data analysis, and as will be further described, notification functionality. One of ordinary skill in the art will appreciate that the policy driven HA standby server workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the various embodiments provided herein provide for using policy-driven high availability (HA) standby servers in a multi-server high availability (HA) computing environment. In one embodiment, one or more policies may be created that define selected sessions for a user (e.g., important sessions to the user) such that only one or more artifacts of each selected session are replicated to one or more HA standby servers. The one or more artifacts and the one or more policies of a selected session may be synchronized from a primary server to the one or more HA standby servers.

In one aspect, the policy based HA may be described as a state of operation (e.g., active state, consistent synchronized state, synchronizing state, disconnected state, disconnected consistent state, etc.). The policy based HA is the HA relationship between two objects. One object may be defined as the active. One object may be defined as the standby. The policy also defines a vector of the relationship. That is, an object may be an artifact and may exist as an active object and/or a standby object as defined and recorded in the policy. The policy may reside alongside the objects that it describes. For example, the policy may be a flat file that resides physically on disk along with the database or metadata that the policy is keeping track of. Alternatively, the policy may also exist in a cloud computing environment and the artifact may be either active or standby. The policy may describe which server the object resides on. Another embodiment of the policy is that the policy may aggregate the objects into a single policy.

The policy may define whether an artifact is active-active meaning that both servers (e.g., HA primary server and HA standby server) are actively managing their workload. In operation, for using the policy-driven HA standby servers, the HA may be set up based on a policy on an active server/HA primary server. The artifact policy may be read. One or more destination HA standby servers may be determined for the artifact to be copied from the active server/HA primary server to the one or more destination HA standby servers to establish communication to the HA standby server. A determination operation may be performed to determine or check whether there is space on the HA standby server. Objects and artifacts may be synchronized to one or more HA standby servers along with the policy (e.g., backing up the metadata from the active to the standby server).

That is, the synchronization is the state representing that an artifact is equal and identical across the two servers. Since the metadata describes 1) the state that the artifact is in, 2) whether the artifact is in active or the standby, and also 3) whether the artifact can recover from the standby, the metadata is also required to be synchronized along with any artifact that is presently being copied. In one aspect, the metadata may be the policy describing the artifact's role as active, standby, and/or unreplicated. It should also be noted that the term "artifact" may be referred to herein as a session, artifact, and/or object. A session may be a representation of a group of named pairs of devices which are in a data replication relationship and can have various states describing the disaster recoverability of a consistent set of volumes from a primary device to a secondary device. Objects may be synchronized to a standby server such as, for example, a volume which is a representation of a logical unit of storage, which is either simplex, duplex pending, or duplex, depending on its state of recoverability to a secondary disaster recovery site.

For setting up the HA based on a created policy on one or more HA standby servers, a wait operation may be performed for communication with N active HA servers, where "N" is a positive integer or selected value. A wake-up operation may be performed when commination is established between the one or more HA standby servers and the N active HA servers. The handshake may be started. The one or more HA standby servers may respond to the N active HA servers with an amount of available space. Data (including the policy) may be synchronized.

Figure 4:
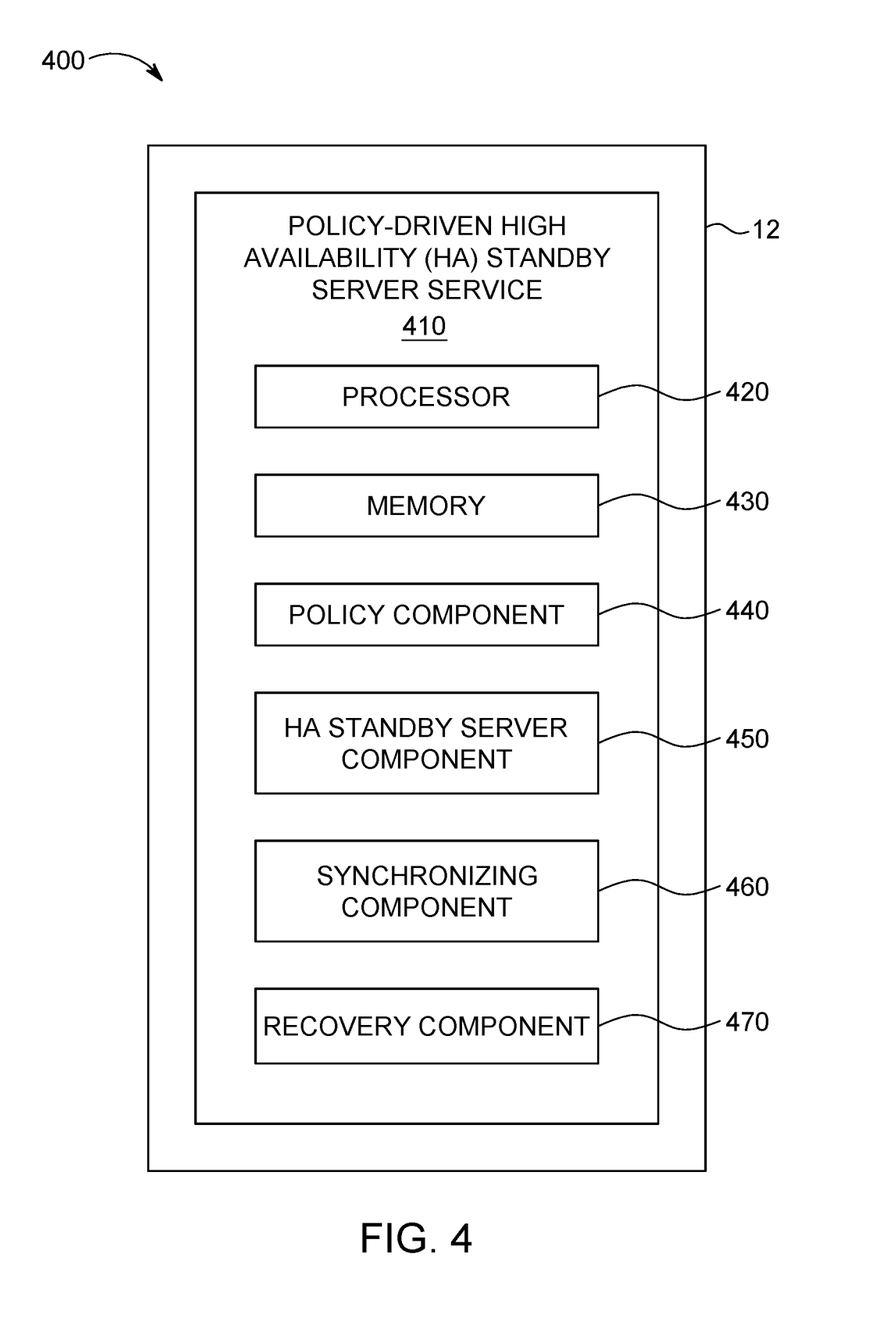
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A policy-driven high availability standby server service 410 is shown, incorporating processing unit 420 to perform various computational, data processing and other functionality in accordance with various aspects of the present invention. The policy-driven high availability standby server service 410 may be provided by the computer system/server 12 of FIG. 1. The processing unit 420 may be in communication with memory 430. The policy-driven high availability standby server service 410 may include a policy component 440, an HA standby server component 450, a synchronizing component 460, and a recovery component 470.

As one of ordinary skill in the art will appreciate, the depiction of the various functional units in policy-driven high availability standby server service 410 is for purposes of illustration, as the functional units may be located within the policy-driven high availability standby server service 410 or elsewhere within and/or between distributed computing components.

In one aspect, the policy component 440 may create one or more policies that define selected sessions for a user such that only one or more artifacts of each selected session are replicated to one or more high availability (HA) standby servers. That is, one or more policies may be created by the policy component 440 to define important sessions to the customer such that only the metadata of that important session that the customer deems important is backed up. The one or more policies may be created in response to the policy component 440 to receive information from a user indicating important sessions determined, selected, or indicated for a user. The one or more policies created by the policy component 440 may define the one or more artifacts as being in a primary state or standby state according to the one or more policies.

In one aspect, as used herein, "important" may be defined as having great significance or value to the user. "Important" may also indicate a prioritized rank or status for a session. Also, important sessions to the user may include sessions that are critical, crucial, vital, primary, foremost, essential, or a combination thereof.

The synchronizing component 460 may be used to synchronize the one or more artifacts and the one or more policies of a selected session from a primary server to one or more HA standby servers. The synchronizing component 460 may also replicate the one or more artifacts of the selected session to one or more HA standby servers.

The HA standby server component 450 may determine, from the one or more created policies, the one or more HA standby servers to replicate the one or more artifacts. The HA standby server component 450 may designate, according to the one or more policies, one or more HA standby servers as being a primary server, an HA standby server, or a combination of being both the primary server and the HA standby server. Additionally, the HA standby server component 450 may designate one or more HA standby servers as being a primary server for the one or more artifacts upon failure of the primary server.

The recovery component 470 may, upon recovery of the primary server from a failure state to an active state (e.g., disaster recovery), recover the one or more artifacts to the primary server according to the one or more policies. That is, the recovery component 470 may enable the primary server to perform a takeover operation, according to the one or more policies, to recover the one or more artifacts from the one or more HA standby servers upon recovery from the failure event by the primary server.

As one of ordinary skill in the art will appreciate, the policy-driven high availability standby server service 410 may implement mathematical modeling, probability and statistical analysis or modeling, machine reasoning, probabilistic logic, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 5A:
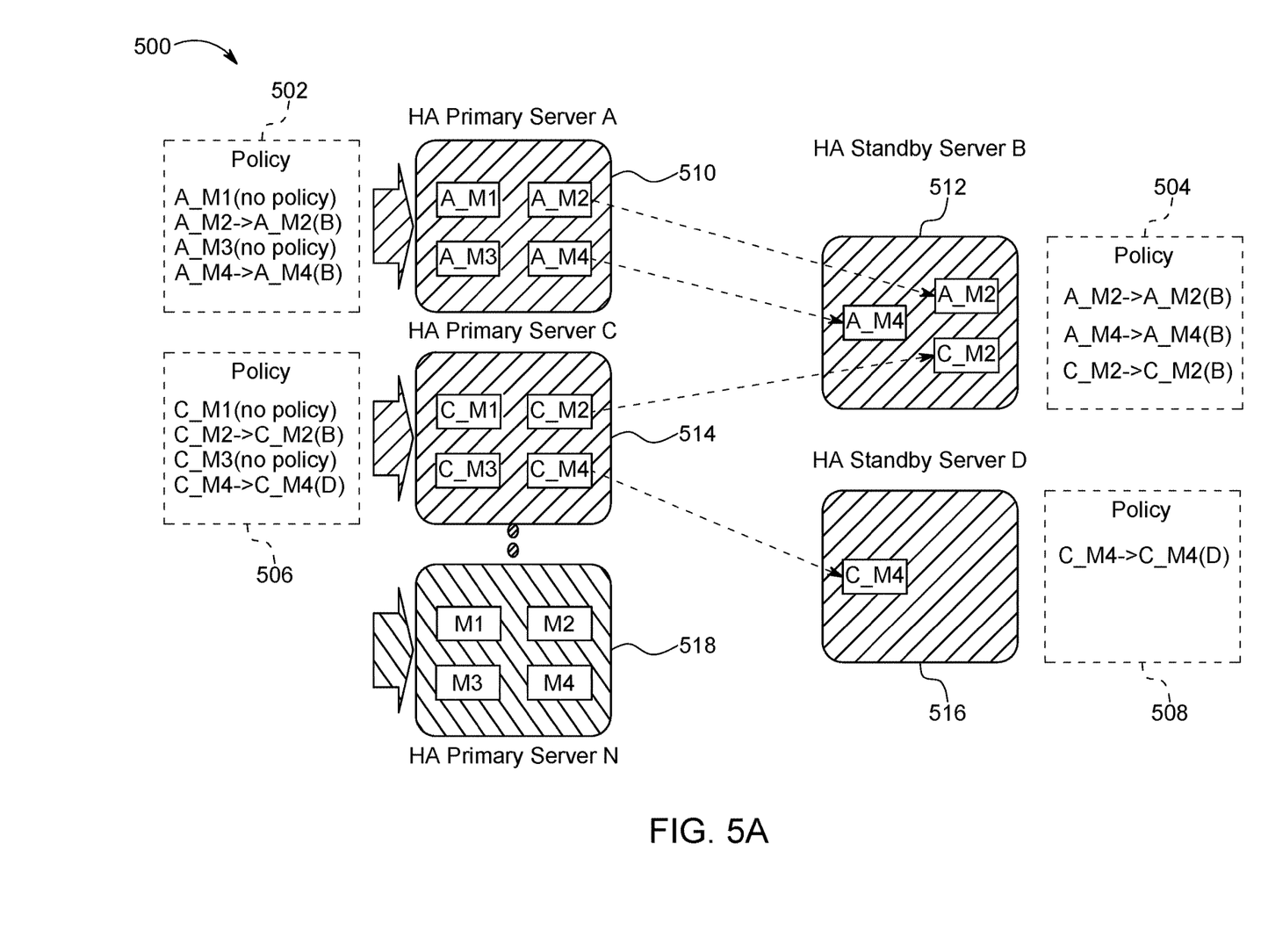
FIGS. 5A-5C are block diagrams depicting an exemplary use of policy-driven high availability standby servers in accordance with aspects of the present invention.
Figure 5B:
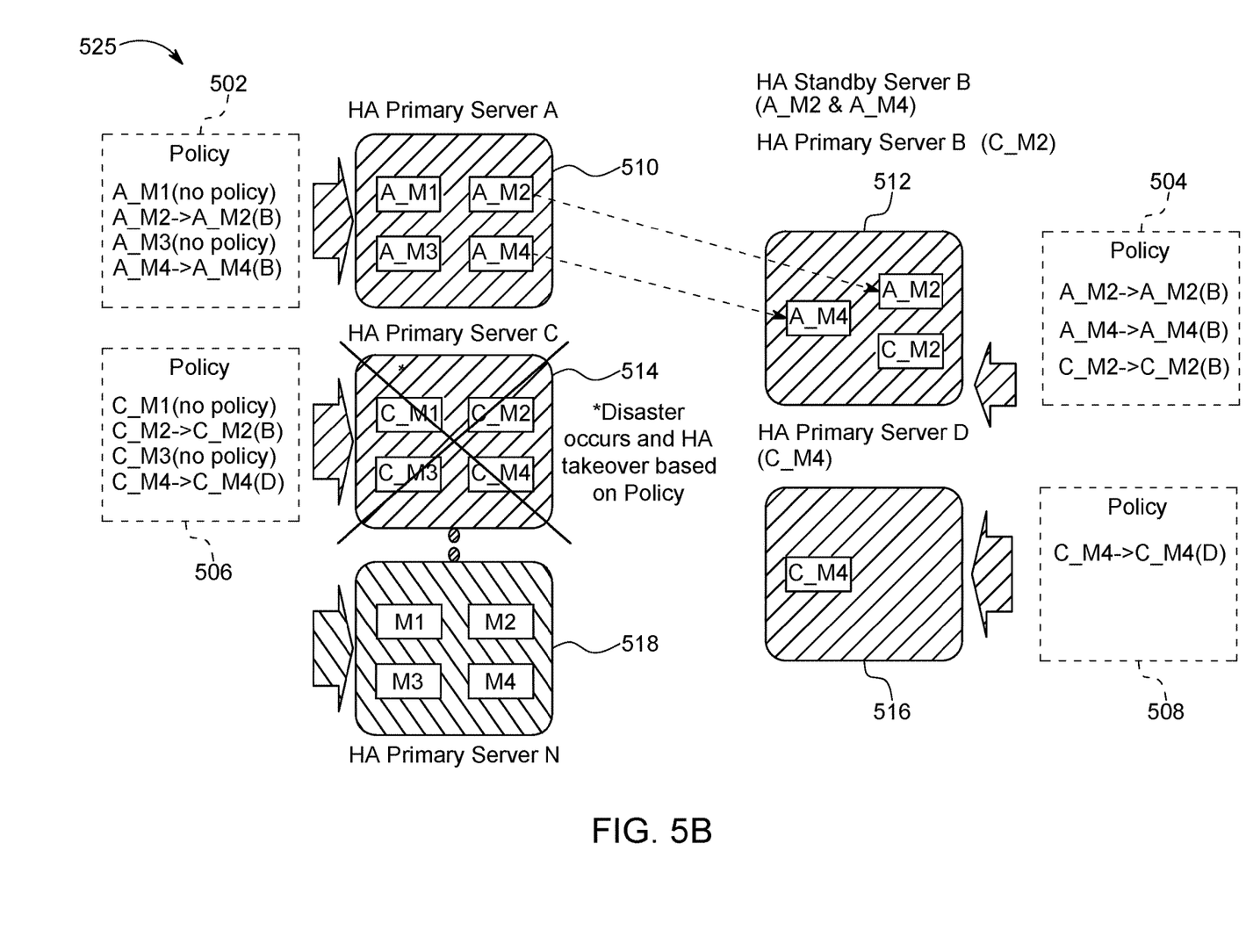
Figure 5C:
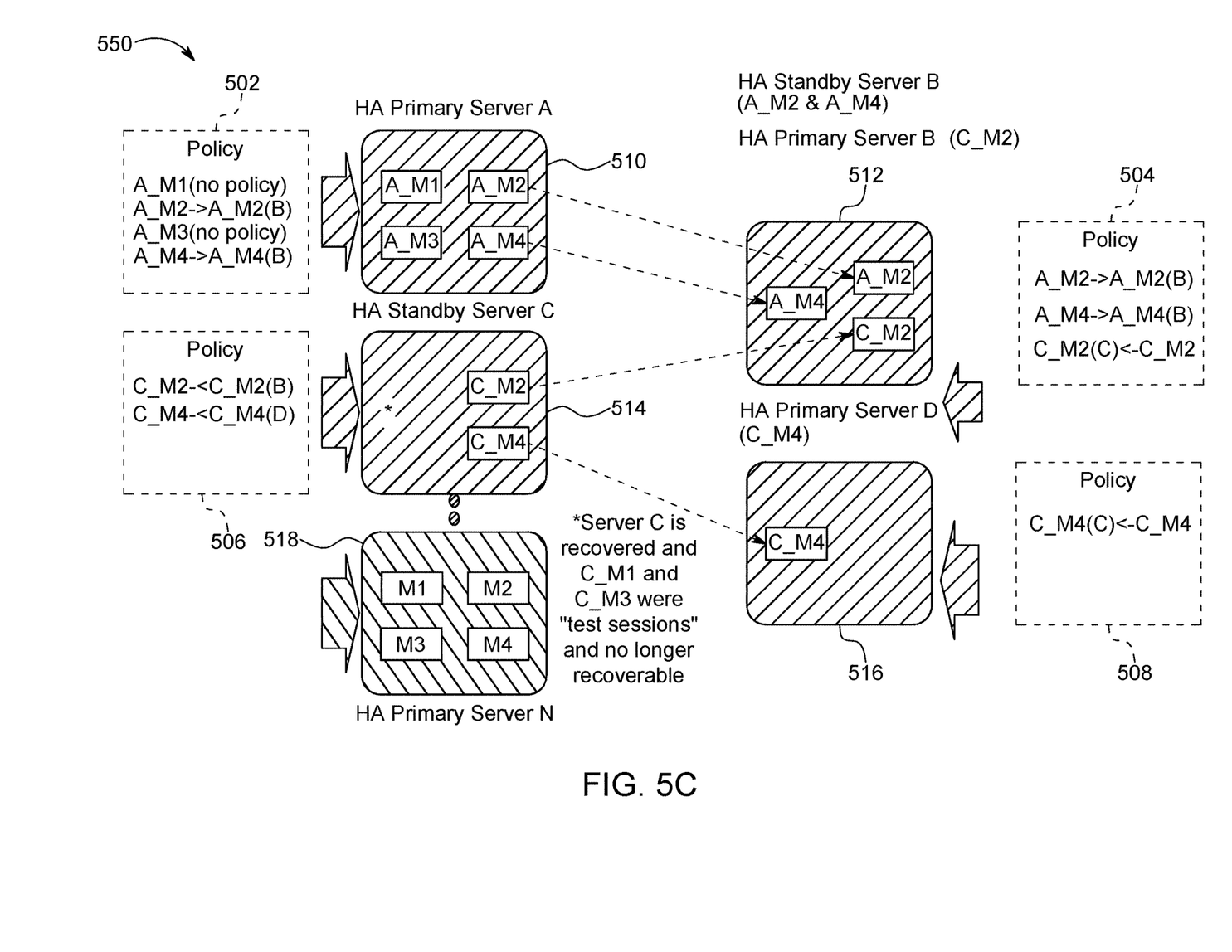

In view of the foregoing, consider the following operation examples illustrated in FIGS. 5A-5C of the implementation of the aforementioned functionality. Operations 500, 525, and 550 of FIGS. 5A-5C may be incorporated into various hardware and software components of a system in accordance with the present invention, such as those described in FIGS. 1-4.

Turning now to FIG. 5A, a diagram 500 depicting an exemplary operation of sharing of an anonymized dataset with decoy records. As illustrated in FIG. 5A, included is an HA primary server A 510, an HA standby server B 512, an HA primary server C 514, an HA standby server D 516, and HA primary server N 518. An initial setup may be performed where each of the active servers (e.g., HA primary server A 510, HA primary server C 514, and HA primary server N 518) have a policy synced up with each active server's HA standby server counterpart.

For example, policy 502 for HA primary server A 510 indicates that artifact A_M1 has no policy, artifact A_M2 is to be backed up on HA standby server B 512, artifact A_M3 has no policy, and artifact A_M4 is to be backed up on HA standby server B 512.

Policy 506 for HA primary server C 514 indicates that artifact C_M1 has no policy, artifact C_M2 is to be backed up on HA standby server B 512, artifact C_M3 has no policy, and artifact C_M4 is to be backed up on HA standby server D 516.

Accordingly, policy 504 on HA standby server B 512 indicates that artifact A_M2 is to be backed up on HA standby server B 512 from HA primary server A 510, artifact A_M4 is to be backed up on HA standby server B 512 from HA primary server A 510, and artifact C_M2 is to be backed up on HA standby server B 512 from HA primary server C 514. Accordingly, artifact A_M2 and artifact A_M4 are designated as having an active state on HA primary server A 510 but have a standby state on HA standby server B 512. Artifact C_M2 is designated as having an active state on HA primary server C 514 but has a standby state on HA standby server B 512.

Policy 508 indicates that artifact C_M4 is to be backed up on HA standby server D 516 from HA primary server C 514. Artifact C_M4 is designated as having an active state on HA primary server C 514 but has a standby state on HA standby server D 516.

It should be noted that in FIG. 5A, each HA server is designated as either an HA primary server or an HA standby server, but such indication is merely illustrated by way of example only, as the initial setup operation. However, the present invention allows for the objects and artifacts themselves and the policy of each object and artifact to be in a primary or standby state as opposed to the entire server having to be designated either a primary server or standby server.

Turning now to FIG. 5B, diagram 525 illustrates that a failure event (e.g., disaster) occurs at HA primary server C 514. Accordingly, artifact C_M2 remains on the HA standby server B 512 according to policy 504, and artifact C_M4 remains backed up on HA standby server D 516 according to policy 508. Policy 504 now indicates that the HA standby server B 512 may function as a both an HA primary server for the artifact C_M2 (since HA primary server C 514 is in a failure state) and also remains the HA standby server for artifact A_M2 and artifact A_M4 relating/corresponding to HA primary server A 510. That is, artifact C_M2 on HA standby server B 512 is now designated as "active state" enabling HA standby server B 512 to serve as the HA primary server for artifact C_M2. On the other hand, artifact A_M2 and artifact A_M4 may remain on HA standby server B 512 as being in a standby state thus HA standby server B 512 remains the HA standby server for artifacts A_M2 and A_M4.

Policy 508 indicates that the HA standby server D 516 may function as an HA primary server for the artifact C_M4. That is, artifact C_M4 on HA standby server D 516 is now designated as "active state" enabling HA standby server D 516 to serve as the HA primary server for artifact C_M4. Thus, HA standby server D 516 may now be designated (e.g., reclassified) as HA primary server D 516.

Turning now to FIG. 5C, operation 550 depicts that HA primary server C 514 of FIG. 5B recovers from the failure event (e.g., disaster), but now becomes HA secondary server C 514. That is, HA primary server C 514 of FIG. 5A-5B is back up and operating or even replaced with another primary server and now becomes an HA secondary server C 514 of FIG. 5C. Artifacts C_M1 and C_M3 were test sessions (not previously backed up as illustrated in FIG. 5A) and are no longer available for recovery.

A takeover operation may be performed according to policy 504 to enable artifact C_M2 to remain in the active state on the HA standby server B 512, which is functioning as the primary server for artifact C_M2 while also operating as the HA standby server for artifacts A_M2 and A_M4. That is, the HA standby server B 512 is both a primary server and a standby server since artifacts stored thereon have both active states and standby states.

In an additional aspect, a takeover operation may be performed according to policy 508 to enable artifact C_M4 to remain in the active state on the HA primary server D 516 (as re-designated in FIG. 5B from HA standby server to HA active server). The new or recovered HA primary server C 514 of FIG. 5A-5B (now HA secondary server C 514 in FIG. 5C) may be designated as HA standby server C 514, as illustrated in FIG. 5C. Artifact C_M2 may be backed up on HA standby server C 514.

Each of the policies 502, 504, 506, and/or 508 may be reconfigured or set to an original configuration such as, for example, as illustrated in FIG. 5A upon a synchronization operation on each policy. That is, a user may can return back to the original state, as represented in FIG. 5A, where the artifacts are back on the originally defined active servers, but synchronizing and doing a takeover.

Figure 6:
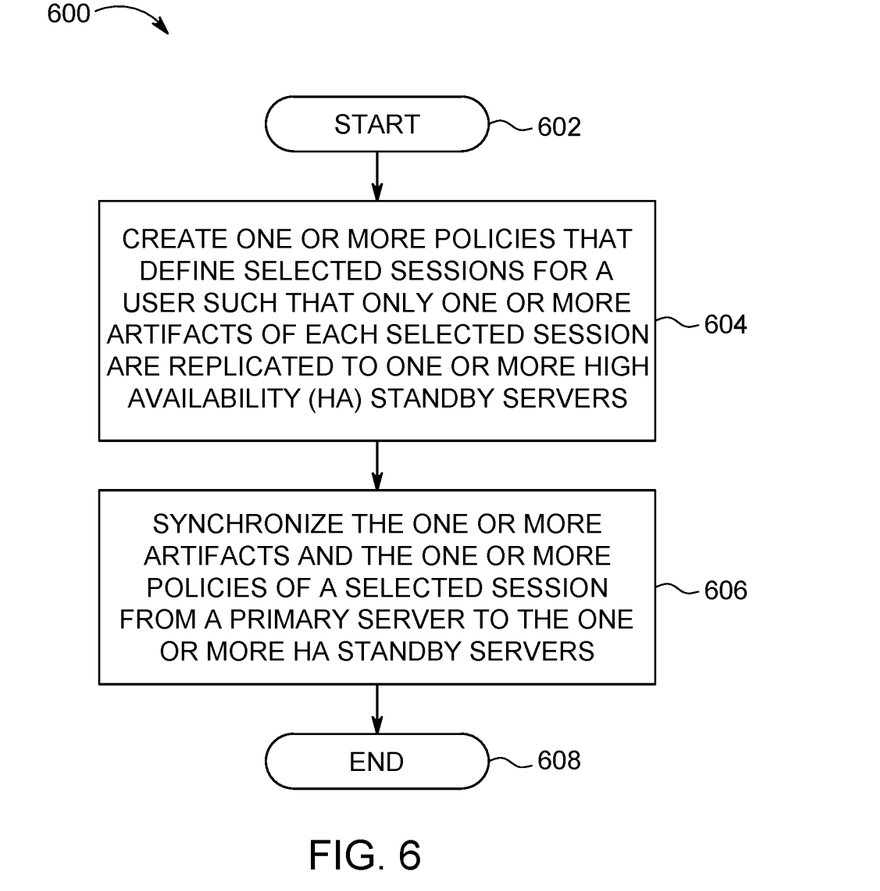
FIG. 6 is a flowchart diagram depicting an additional exemplary method for using policy-driven high availability standby servers in a computing environment in which aspects of the present invention may be realized.

FIG. 6 is a flowchart diagram depicting an exemplary method for using policy-driven high availability standby servers in a multi-server HA computing environment. The functionality 600 may be implemented as a method executed as instructions on a machine, where the instructions are included on at least one computer readable medium or one non-transitory machine-readable storage medium. Starting in block 602, one or more policies may be created that define selected sessions for a user (e.g., important sessions to the user) such that only one or more artifacts of each selected session are replicated to one or more HA standby servers, as in block 604. The one or more artifacts and the one or more policies of a selected session may be synchronized from a primary server to the one or more HA standby servers, as in block 606. The method 600 ends, as in block 608.

Figure 7:
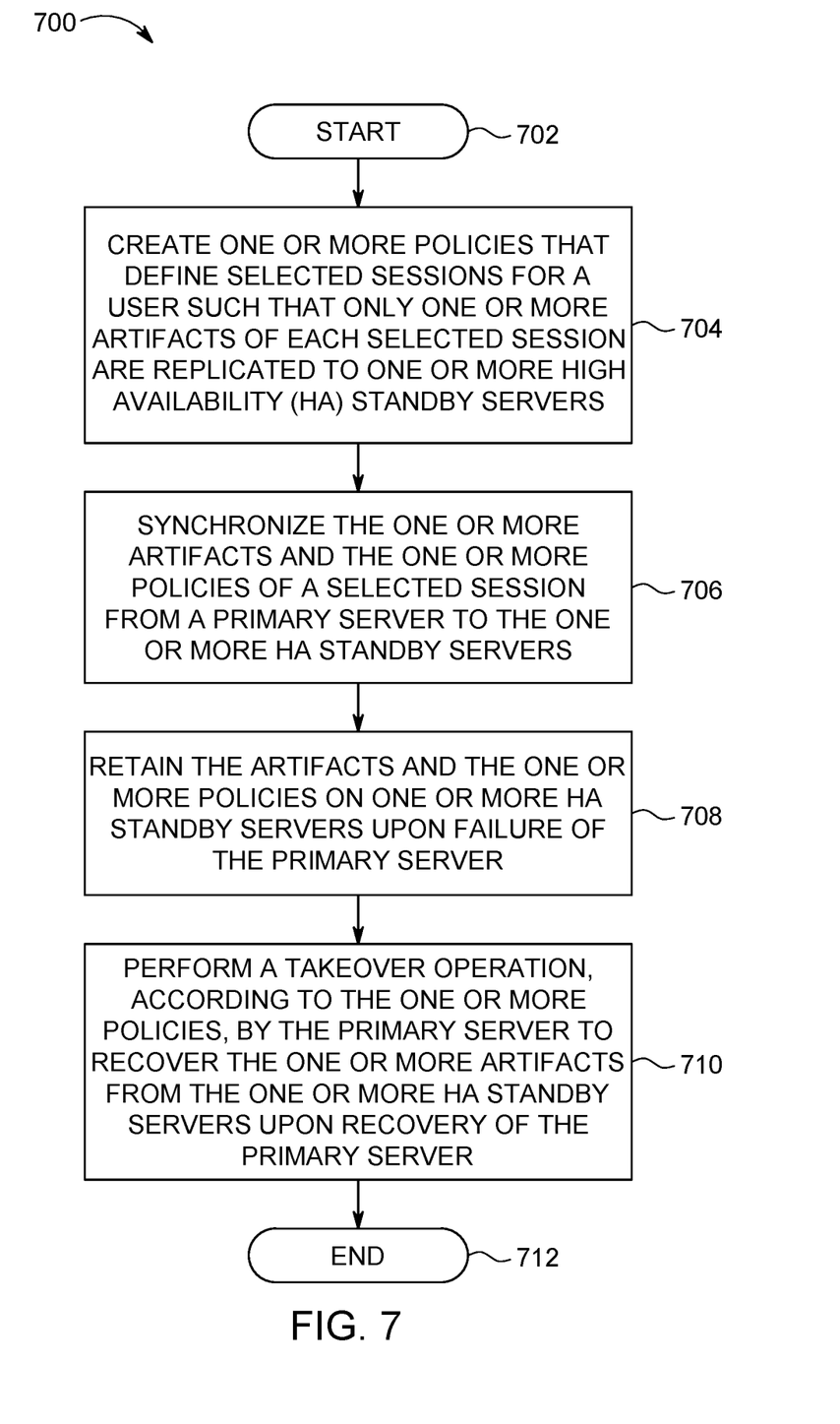
FIG. 7 is a flowchart diagram depicting an additional exemplary method for using policy-driven high availability standby servers in a computing environment in which aspects of the present invention may be realized.

FIG. 7 is a flowchart diagram depicting an exemplary method for using policy-driven high availability standby servers in a multi-server HA computing environment. The functionality 700 may be implemented as a method executed as instructions on a machine, where the instructions are included on at least one computer readable medium or one non-transitory machine-readable storage medium. Starting in block 702, one or more policies may be created that define selected sessions for a user (e.g., important sessions to the user) such that only one or more artifacts of each selected session are replicated to one or more HA standby servers, as in block 704. The one or more artifacts and the one or more policies of a selected session may be synchronized from a primary server to the one or more HA standby servers, as in block 706. The artifacts and the one or more policies may be retained on one or more HA standby servers for a failure event of the primary server, as in block 708. A takeover operation may be performed, according to the one or more policies, by the primary server to recover the one or more artifacts from the one or more HA standby servers upon recovery from the failure event by the primary server, as block 710. The method 700 ends, as in block 712.

In one aspect, in conjunction with and/or as part of at least one block of FIGS. 6-7, the operations of methods 600 or 700 may include each of the following. The operations of methods 600 or 700 may determine, from the one or more policies, the one or more HA standby servers to replicate the one or more artifacts. The one or more artifacts of the selected session may be replicated to the one or more HA standby servers.

The operations of methods 600 or 700 may define the one or more artifacts as being in a primary state or standby state according to the one or more policies. Additionally, the operations of methods 600 or 700 may designate, according to the one or more policies, the one or more HA standby servers as being a primary server, an HA standby server, or a combination of being both the primary server and the HA standby server. Upon failure of the primary server, the one or more HA standby servers may function and operate as a primary server for the one or more artifacts retained thereon. The operations of methods 600 or 700 may, upon recovery of the primary server, recover the one or more artifacts to the primary server according to the one or more policies.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for using policy-driven high availability standby servers in a computing environment, comprising:
creating one or more policies that define selected sessions for a user such that only one or more artifacts of each selected session are replicated to one or more high availability (HA) standby servers; wherein the one or more artifacts comprise configuration metadata of one or more applications utilized by the user such that only the configuration metadata from the selected sessions of the utilization of the one or more applications are designated by the one or more policies to be replicated to the one or more HA standby servers;
synchronizing the one or more artifacts and the one or more policies of a selected session from a primary server to the one or more HA standby servers; wherein the primary server and the one or more HA standby servers are each determined on a per-artifact basis according to the one or more policies of each of the one or more artifacts; and
defining the one or more artifacts as being in a primary state or standby state within the one or more policies; wherein the definition is independent for each of the one or more artifacts on the per-artifact basis such that a first one of the one or more artifacts being in the primary state is stored on a server designated as the primary server for the first one of the artifacts notwithstanding the server is additionally designated as one of the one or more HA standby servers for a second one of the one or more artifacts being in the standby state.

2. The method of claim 1, further including determining, from the one or more policies, the one or more HA standby servers to replicate the one or more artifacts.

3. The method of claim 1, further including replicating the one or more artifacts of the selected session to the one or more HA standby servers.

4. The method of claim 1, further including designating, according to the one or more policies, the one or more HA standby servers as being the designated primary server, an HA standby server, or a combination of being both the designated primary server and the HA standby server.

5. The method of claim 1, further including designating the one or more HA standby servers as being the designated primary server for the one or more artifacts upon failure of the primary server.

6. The method of claim 5, further including, upon recovery of the primary server, recovering the one or more artifacts to the primary server from the one or more HA standby servers according to the one or more policies.

7. A system for using policy-driven high availability standby servers in a computing environment, comprising:
a hardware processor; and
a memory device in communication with the hardware processor, the memory device storing executable instructions that when executed by the hardware processor cause the system to:
create one or more policies that define selected sessions for a user such that only one or more artifacts of each selected session are replicated to one or more high availability (HA) standby servers; wherein the one or more artifacts comprise configuration metadata of one or more applications utilized by the user such that only the configuration metadata from the selected sessions of the utilization of the one or more applications are designated by the one or more policies to be replicated to the one or more HA standby servers;
synchronize the one or more artifacts and the one or more policies of a selected session from a primary server to the one or more HA standby servers; wherein the primary server and the one or more HA standby servers are each determined on a per-artifact basis according to the one or more policies of each of the one or more artifacts; and
define the one or more artifacts as being in a primary state or standby state within the one or more policies; wherein the definition is independent for each of the one or more artifacts on the per-artifact basis such that a first one of the one or more artifacts being in the primary state is stored on a server designated as the primary server for the first one of the artifacts notwithstanding the server is additionally designated as one of the one or more HA standby servers for a second one of the one or more artifacts being in the standby state.

8. The system of claim 7, wherein the executable instructions that when executed cause the system to determine, from the one or more policies, the one or more HA standby servers to replicate the one or more artifacts.

9. The system of claim 7, wherein the executable instructions that when executed cause the system to replicate the one or more artifacts of the selected session to the one or more HA standby servers.

10. The system of claim 7, wherein the executable instructions that when executed cause the system to designate, according to the one or more policies, the one or more HA standby servers as being the designated primary server, an HA standby server, or a combination of being both the designated primary server and the HA standby server.

11. The system of claim 7, wherein the executable instructions that when executed cause the system to designate the one or more HA standby servers as being the designated primary server for the one or more artifacts upon failure of the primary server.

12. The system of claim 11, wherein the executable instructions that when executed cause the system to, upon recovery of the primary server, recover the one or more artifacts to the primary server from the one or more HA standby servers according to the one or more policies.

13. A computer program product for, by a processor, using policy-driven high availability standby servers in a computing environment, the computer program product comprising a non-transitory computer-readable storage medium having computer-readable program code portions stored therein, the computer-readable program code portions comprising:
an executable portion that creates one or more policies that define selected sessions for a user such that only one or more artifacts of each selected session are replicated to one or more high availability (HA) standby servers; wherein the one or more artifacts comprise configuration metadata of one or more applications utilized by the user such that only the configuration metadata from the selected sessions of the utilization of the one or more applications are designated by the one or more policies to be replicated to the one or more HA standby servers;

an executable portion that synchronizes the one or more artifacts and the one or more policies of a selected session from a primary server to the one or more HA standby servers; wherein the primary server and the one or more HA standby servers are each determined on a per-artifact basis according to the one or more policies of each of the one or more artifacts; and an executable portion that defines the one or more artifacts as being in a primary state or standby state within the one or more policies; wherein the definition is independent for each of the one or more artifacts on the per-artifact basis such that a first one of the one or more artifacts being in the primary state is stored on a server designated as the primary server for the first one of the artifacts notwithstanding the server is additionally designated as one of the one or more HA standby servers for a second one of the one or more artifacts being in the standby state.

14. The computer program product of claim 13, further including an executable portion that determines, from the one or more policies, the one or more HA standby servers to replicate the one or more artifacts.

15. The computer program product of claim 13, further including an executable portion that replicates the one or more artifacts of the selected session to the one or more HA standby servers.

16. The computer program product of claim 13, further including an executable portion that designates, according to the one or more policies, the one or more HA standby servers as being the designated primary server, an HA standby server, or a combination of being both the designated primary server and the HA standby server.

17. The computer program product of claim 13, further including an executable portion that:

designates the one or more HA standby servers as being the designated primary server for the one or more artifacts upon failure of the primary server; and restores the one or more artifacts to the primary server from the one or more HA standby servers according to the one or more policies upon recovery from the failure of the primary server.

* * * * *